(12) United States Patent
Fan (10) Patent No.: US 10,868,804 B2
(45) Date of Patent: Dec. 15, 2020

(54) APPLICATION PACKAGE INSPECTION METHOD, INSPECTION DEVICE AND COMPUTER-READABLE STORAGE MEDIUM

(71) Applicant: TENCENT TECHNOLOGY (SHENZHEN) COMPANY LIMITED, Shenzhen (CN)

(72) Inventor: Jin Fan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 297 days.

(21) Appl. No.: 16/026,341

(22) Filed: Jul. 3, 2018

(65) Prior Publication Data

US 2018/0316660 A1    Nov. 1, 2018

Related U.S. Application Data

(63) Continuation of application No. PCT/CN2017/076485, filed on Mar. 13, 2017.

(30) Foreign Application Priority Data

Apr. 29, 2016  (CN) .......................... 2016 1 0286141

(51) Int. Cl.
*H04L 29/06* (2006.01)
*G06F 21/51* (2013.01)
(Continued)

(52) U.S. Cl.
CPC .......... *H04L 63/0823* (2013.01); *G06F 21/51* (2013.01); *G06F 21/57* (2013.01);
(Continued)

(58) Field of Classification Search
USPC ........ 713/150, 156, 163, 181; 726/2, 21, 36; 380/255, 264, 276
See application file for complete search history.

(56) References Cited

U.S. PATENT DOCUMENTS 6,256,664 B1 * 7/2001 Donoho ................. G06Q 10/10
                                                            709/204
7,406,603 B1 * 7/2008 MacKay ................. G06F 21/10
                                                            713/193
(Continued)

FOREIGN PATENT DOCUMENTS

CN      102779257 A     11/2012
CN      103164260 A     6/2013
(Continued)

OTHER PUBLICATIONS

The World Intellectual Property Organization (WIPO) International Search Report for PCT/CN2017/076485 dated Jun. 14, 2017 5 Pages (including translation).
(Continued)

*Primary Examiner* — Sharif E Ullah
(74) *Attorney, Agent, or Firm* — Anova Law Group, PLLC (57) ABSTRACT

An application package inspection method is provided. The method includes: obtaining a to-be-inspected application installation package; and extracting an inherent attribute identifier and a certificate of the to-be-inspected application package from the to-be-inspected application package. Further, an authentication certificate corresponding to the inherent attribute identifier of the to-be-inspected application package is obtained from an information library storing correspondence relationships between inherent attribute identifiers and authentication certificates. The method also includes comparing the certificate of the to-be-inspected
(Continued)

application package with the authentication certificate to obtain an inspection result of the to-be-inspected application package.

18 Claims, 5 Drawing Sheets

(51) Int. Cl.
  *G06F 21/57* (2013.01)
  *G06F 21/64* (2013.01)
  *H04L 9/32* (2006.01)
(52) U.S. Cl.
  CPC ............ *G06F 21/64* (2013.01); *H04L 9/3263* (2013.01); *H04L 63/126* (2013.01)

(56) References Cited

U.S. PATENT DOCUMENTS

| | | | | |
|---|---|---|---|---|
| 8,613,080 | B2* | 12/2013 | Wysopal | G06F 21/577 726/19 |
| 9,112,854 | B1* | 8/2015 | Bhimanaik | H04L 63/0823 |
| 2002/0065884 | A1* | 5/2002 | Donoho | H04L 67/20 709/204 |
| 2005/0049924 | A1* | 3/2005 | DeBettencourt | H04L 43/028 705/21 |
| 2008/0010352 | A1* | 1/2008 | Donoho | G06Q 30/02 709/206 |
| 2012/0144187 | A1* | 6/2012 | Wei | H04L 63/0281 713/152 |
| 2015/0207708 | A1* | 7/2015 | Raleigh | H04L 65/607 709/217 |

FOREIGN PATENT DOCUMENTS

| | | |
|---|---|---|
| CN | 103685138 A | 3/2014 |
| CN | 103778367 A | 5/2014 |
| CN | 103778448 A | 5/2014 |
| CN | 103888252 A | 6/2014 |
| CN | 104123491 A | 10/2014 |

OTHER PUBLICATIONS

The State Intellectual Property Office of the People's Republic of China (SIPO) Office Action 1 for 201610286141.3 dated Sep. 30, 2019 10 Pages (including translation).

* cited by examiner

APPLICATION PACKAGE INSPECTION METHOD, INSPECTION DEVICE AND COMPUTER-READABLE STORAGE MEDIUM

RELATED APPLICATION

This application is a continuation application of PCT Patent Application No. PCT/CN2017/076485, filed on Mar. 13, 2017, which claims priority to Chinese Patent Application No. 201610286141.3, entitled "APPLICATION PACKAGE INSPECTION METHOD AND APPARATUS" filed with the Patent Office of China on Apr. 29, 2016, which is incorporated by reference in its entirety.

FIELD OF THE TECHNOLOGY

The present disclosure relates to the field of data security, and in particular, to an application package inspection method, an inspection device, and a computer-readable storage medium.

BACKGROUND OF THE DISCLOSURE

With the development of network technologies, more users participate in social events by using a network. For example, the users obtain information of news and items and chat by using the network. In view of this, applications providing various services are generated, and some packages of various applications pass security authentication and some do not pass the security authentication. To distinguish the packages of the applications that pass the security authentication from those do not pass the security authentication, usually, whether the package of the application passes the security authentication is determined by manually distinguishing an identity of a developer. However, such a distinguishing manner may be easily skirted by another developer, leading to a large number of missed distinguishes and a low recognition rate on unsecure application packages.

SUMMARY

According to various embodiments of this application, an application package inspection method, an inspection device, and a computer-readable storage medium are provided.

An application package inspection method is provided. The method includes obtaining a to-be-inspected application package; and extracting an inherent attribute identifier and a certificate of the to-be-inspected application package from the to-be-inspected application package. Further, an authentication certificate corresponding to the inherent attribute identifier of the to-be-inspected application package is obtained from an information library storing correspondence relationships between inherent attribute identifiers and authentication certificates. The method also includes comparing the certificate of the to-be-inspected application package with the authentication certificate to obtain an inspection result of the to-be-inspected application package.

An inspection device is provided. The device includes a memory and a processor. Computer-readable instructions are stored in the memory, and when executed by the processor, cause the processor to perform: obtaining a to-be-inspected application package; and extracting an inherent attribute identifier and a certificate of the to-be-inspected application package from the to-be-inspected application package. Further, an authentication certificate corresponding to the inherent attribute identifier of the to-be-inspected application package is obtained from an information library storing correspondence relationships between inherent attribute identifiers and authentication certificates. The instructions also cause the processor to compare the certificate of the to-be-inspected application package with the authentication certificate to obtain an inspection result of the to-be-inspected application package.

A non-transitory storage medium is provided. The storage medium stores computer program code executable by at least one processor to perform: obtaining a to-be-inspected application package; and extracting an inherent attribute identifier and a certificate of the to-be-inspected application package from the to-be-inspected application package. Further, an authentication certificate corresponding to the inherent attribute identifier of the to-be-inspected application package is obtained from an information library storing correspondence relationships between inherent attribute identifiers and authentication certificates. The program code also cause the at least one processor to compare the certificate of the to-be-inspected application package with the authentication certificate to obtain an inspection result of the to-be-inspected application package.

Details of one or more embodiments of the present invention are provided in the following accompanying drawings and descriptions. Other features, objectives, and advantages of the present disclosure become clear in the specification, the accompanying drawings, and the claims.

BRIEF DESCRIPTION OF THE DRAWINGS

To describe the technical solutions in the embodiments of the present invention or in the existing technology more clearly, the following briefly describes the accompanying drawings required for describing the embodiments or the existing technology. Apparently, the accompanying drawings in the following description show merely some embodiments of the present invention, and a person of ordinary skill in the art may still derive other accompanying drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Figure 1:
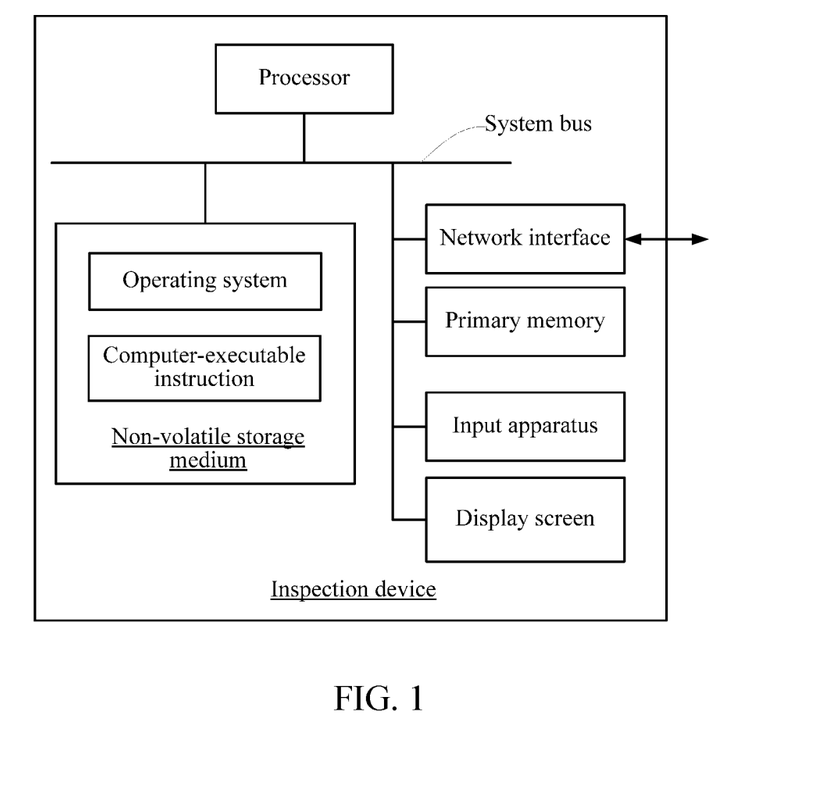
FIG. 1 is a schematic diagram of an inner structure of an inspection device according to an embodiment.

FIG. 1 is a schematic diagram of an inner structure of an inspection device according to an embodiment. As shown in FIG. 1, the inspection device includes a processor, a non-volatile storage medium, a primary memory, a network interface, a display screen, and an input apparatus that are connected by using a system bus. The non-volatile storage medium stores an operating system and computer-executable instructions, and when executed, the computer-executable instructions cause the processor to perform steps to implement an application package inspection method. The processor is configured to provide computing and control capabilities, to support running of the inspection device. The primary memory in the inspection device provides a running environment for caching the operating system in the non-volatile storage medium and the computer-executable instructions. The display screen of the inspection device may be a liquid crystal display screen, an e-ink display screen, or the like. The input apparatus may be a touch layer covering the display screen, or may be a button, a trackball, or a touchpad disposed on a housing of the inspection device, or may be an external keyboard, touchpad, mouse, or the like. The inspection device may be a mobile phone, a tablet computer, a personal digital assistant, a wearable device, a server, a cloud, or the like. A person skilled in the art may understand that, in the structure shown in FIG. 1, a block diagram of a partial structure related to a solution in this application is shown, and does not constitute a limit to the inspection device to which the solution in this application is applied. Specifically, the inspection device may include more components or fewer components than those shown in the figure, or some components may be combined, or a different component deployment may be used.

Figure 2:
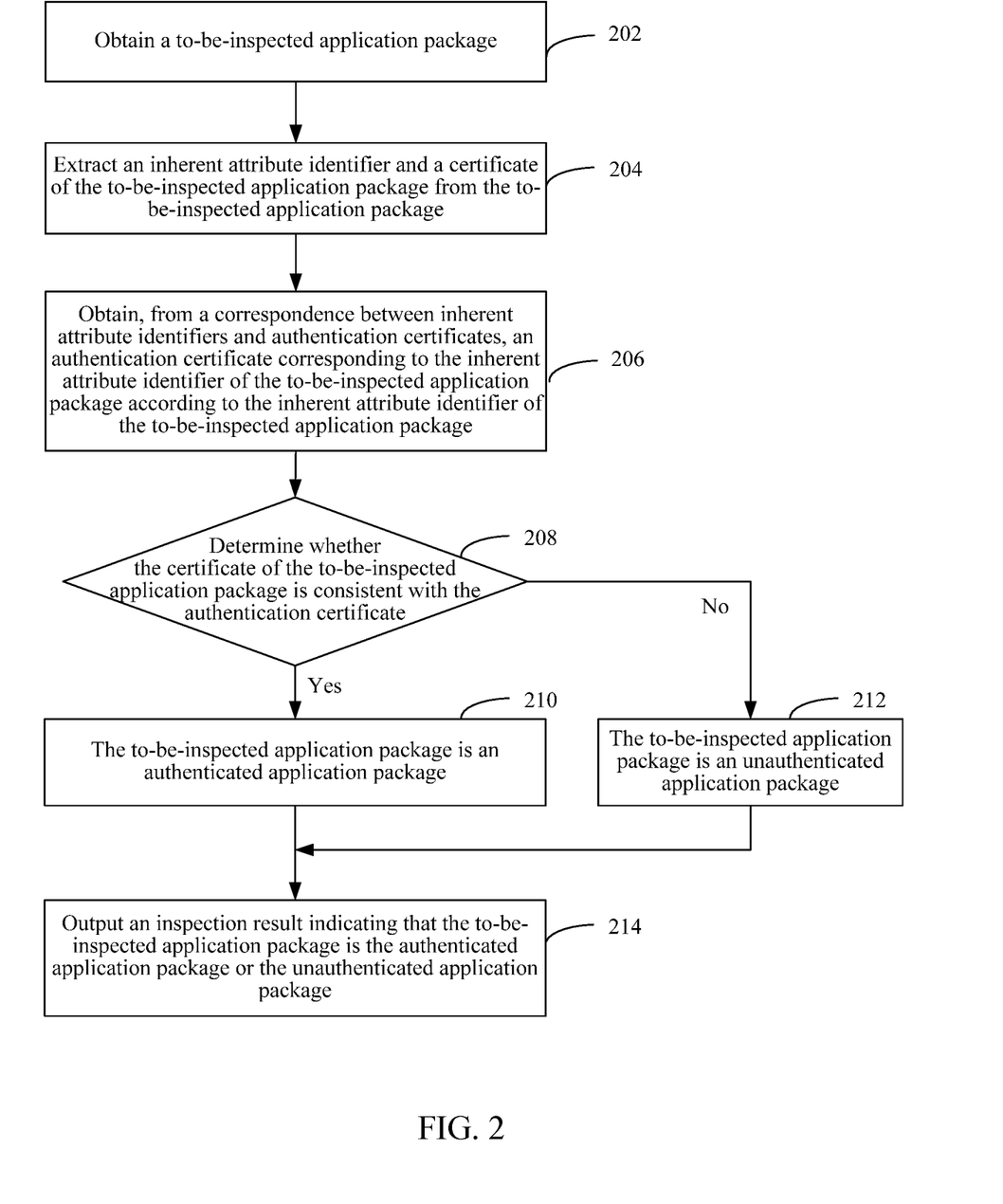
FIG. 2 is a flowchart of an application package inspection method according to an embodiment.

FIG. 2 is a flowchart of an application package inspection method according to an embodiment. As shown in FIG. 2, an application package inspection method runs on the inspection device of FIG. 1, including:

Step 202: Obtain a to-be-inspected application package.

Specifically, a terminal obtains the to-be-inspected application package input by using an inspection client or a browser by a user and uploads same to a serving end. For example, the disclosed inspection device may provide an inspection graphical user interface (GUI). The GUI may provide an automatic inspection option. When the automatic inspection option is selected by the user on the GUI, the disclosed inspection device may automatically scan local files and obtain locally-stored application package files. The GUI may provide a manual inspection option. When the manual inspection option is selected, the disclosed inspection device may further provide a UI that allows the user to browse a file directory and obtain one or more to-be-inspected application package files based on use selection. The GUI may be implemented in an application program installed on a user terminal and/or on a webpage accessible by a browser. When the to-be-inspected application packages are identified, the application package files are uploaded to a server for further processing and determination.

Alternatively, an application package captured from a network or an application store by the serving end serves as the to-be-inspected application package. The serving end may be located on the server, the cloud, or the like.

Step 204: Extract an inherent attribute identifier and a certificate of the to-be-inspected application package from the to-be-inspected application package.

Specifically, the application package is an Android package (APK) file. The APK file is a compressed package in a zip format. The APK file is decompressed by using a standard decompression library to obtain a Manifest.xml file, and the inherent attribute identifier and the certificate of the to-be-inspected application package can be obtained. The inherent attribute identifier is used for uniquely indicating the to-be-inspected application package. The inherent attribute identifier may include a package identifier and/or a software name. The package identifier is used for uniquely identifying a package. The package identifier may be a character string formed by one or more of digits, letters, characters, and text. The package identifier may be a package name. The software name is a name of software that uniquely identifies the to-be-inspected application package. The Manifest.xml file is an information description file of the entire application and defines component information of an activity, a service, a content provider, and a broadcast receiver included in the application. Each application needs to include an AndroidManifest.xml file in a root directory, and a name of the file cannot be modified. The file mainly provides an information description as follows: a Java package naming the application. This package name is used for uniquely identifying the application. The file describes the components of activity, service, content provider, and broadcast receiver included in the application, defines a process of running the application, declares permission required when the application needs to access a limited application programming interface (API), declares permission required if another program expects to access the component of the application, declares an Ophone API of a minimum level required for normal running of the application, and lists a library to which the application needs to connect during running.

For example, an application A has a plurality of authenticated packages and a package name thereof is com.ab-c.mm. A software name is WeChat.

The certificate is obtained by encrypting the application by using a private key by a developer. This is irreversible. In a normal case, one APK file has one and only one certificate.

Step 206: Obtain, from correspondence relationships between inherent attribute identifiers and authentication certificates, an authentication certificate corresponding to the inherent attribute identifier of the to-be-inspected application package according to the inherent attribute identifier of the to-be-inspected application package.

In some embodiments, the correspondence relationships between the inherent attribute identifier and the authentication certificate may be pre-established, and the correspondence relationships are stored in an authentication certificate information library corresponding to inherent attribute identifiers and the authentication certificate.

If the inherent attribute identifier includes the package identifier, a correspondence between the package identifier and the authentication certificate is stored in an authentication certificate information library corresponding to package identifiers. If the inherent attribute identifier includes the software name, a correspondence between the software name and the authentication certificate is stored in an authentication certificate information library corresponding to software names. If the inherent attribute identifier includes the package identifier and the software name, the correspondence between the package identifier and the authentication certificate is stored in the authentication certificate information library corresponding to package identifiers, and the correspondence between the software name and the authentication certificate is stored in the authentication certificate information library corresponding to software names.

The authentication certificate is a certificate of an application package provided by a software provider who passes security authentication. For example, a certificate in a package of a Windows 10 operating system provided by Microsoft.

Step 208: Determine whether the certificate of the to-be-inspected application package is consistent with the authentication certificate. If the certificate of the to-be-inspected application package is consistent with the authentication certificate, perform step 210, or if the certificate of the to-be-inspected application package is not consistent with the authentication certificate, perform step 212.

In some embodiments, a message digest value (for example, an md5 value) of the certificate of the to-be-inspected application package and a message digest value of the authentication certificate may be obtained. The message digest value of the certificate of the to-be-inspected application package is compared with the message digest value of the authentication certificate. If the message digest value of the certificate of the to-be-inspected application package is the same as the message digest value of the authentication certificate, the certificate of the to-be-inspected application package is consistent with the authentication certificate of the inherent attribute identifier of the to-be-inspected application package, or if the message digest value of the certificate of the to-be-inspected application package is different from the message digest value of the authentication certificate, the certificate of the to-be-inspected application package is not consistent with the authentication certificate of the inherent attribute identifier of the to-be-inspected application package.

Step 210: The to-be-inspected application package is an authenticated application package. Subsequently, perform step 214.

In some embodiments, the certificate of the to-be-inspected application package is consistent with the authentication certificate, and it indicates that the to-be-inspected application package is an authenticated application package, that is, an authorized application package.

Step 212: The to-be-inspected application package is an unauthenticated application package. Subsequently, perform step 214.

In some embodiments, the certificate of the to-be-inspected application package is not consistent with the authentication certificate, and it indicates that the to-be-inspected application package is an unauthenticated application package, that is, a counterfeited application package.

Step 214: Output an inspection result indicating that the to-be-inspected application package is an authenticated application package or an unauthenticated application package.

Specifically, the certificate of the to-be-inspected application package may be compared with the authentication certificate to obtain an inspection result of the to-be-inspected application package.

The certificate of the to-be-inspected application package may be compared with the authentication certificate to obtain an inspection result of the to-be-inspected application package, and step 208 to step 212 may be included.

In the foregoing application package inspection method, by extracting the inherent attribute identifier and the certificate of the to-be-inspected application package, according to the inherent attribute identifier, a corresponding authentication certificate is found from the correspondence between inherent attribute identifiers and authentication certificates. The certificate of the to-be-inspected application package is compared with the authentication certificate, and if the to-be-inspected application package is the same as the authentication certificate, the to-be-inspected application package is an authenticated application package, or if the to-be-inspected application package is different from the authentication certificate, the to-be-inspected application package is an unauthenticated application package. The inspection accuracy is high and may basically reach to 100%. An inspection time is short, and no time and space bottleneck is generated. Therefore, a real-time query service may be provided for massive query systems. In some embodiments, comparing to application package inspection method in prior art that relies on similarity comparison on developer identity and other application development information which causes a long inspection period, the disclosed method can respond to massive requests and provide instant results with high accuracy rate.

In an embodiment, before the obtaining a to-be-inspected application package, the foregoing application package inspection further includes: pre-establishing a correspondence between an inherent attribute identifier of an application package and an authentication certificate.

In some embodiments, the established correspondence between the inherent attribute identifier of the application package and the authentication certificate may be stored in an authentication certificate information library corresponding to inherent attribute identifiers. Alternatively, a table may be established, and the correspondence between inherent attribute identifiers and authentication certificates is recorded by using the table. The inherent attribute identifier is used as a key word to establish an index of authentication certificates.

Further, the step of pre-establishing a correspondence between an inherent attribute identifier of an application package and an authentication certificate includes: obtaining an application package that passes security authentication from a network; extracting an inherent attribute identifier and a corresponding authentication certificate of the application package from the application package that passes the security authentication; and establishing the correspondence between the inherent attribute identifier of the application package and the authentication certificate according to the inherent attribute identifier and the authentication certificate of the application package.

In some embodiments, the application package that passes the security authentication may be obtained from the application store or an Android market. The inherent attribute identifier of the application package that passes the security authentication and the corresponding authentication certificate are extracted. Subsequently, the inherent attribute identifier is used as a key word to establish an index of authentication certificates. That is, the correspondence between inherent attribute identifiers and authentication certificates is established.

The inherent attribute identifier of the application package and the corresponding authentication certificate are extracted from the application package that passes the security authentication, thereby ensuring the accuracy and security of the inherent attribute identifier of the application package and the corresponding authentication certificate.

In an embodiment, the foregoing application package inspection method further includes: periodically obtaining a latest inherent attribute identifier of the application package and a latest corresponding authentication certificate; and updating the correspondence between the inherent attribute identifier of the application package and the authentication certificate based on the latest inherent attribute identifier and the latest corresponding authentication certificate.

In some embodiments, according to requirements, a periodical period of time may be set to, for example, one day, one week, and one month. The application package that passes the security authentication may be periodically obtained from the application store or the Android market. The inherent attribute identifier of the application package that passes the security authentication and the corresponding authentication certificate are extracted from the application package. The correspondence between the inherent attribute identifier of the application package and the authentication certificate is updated and is stored in the authentication certificate information library corresponding to inherent attribute identifiers. Further, application packages that pass the security authentication obtained in the current period may include a new application package whose information is not previously stored in the authentication certificate information library. The new application package may be analyzed to extract corresponding inherent attribute identifier authentication certificate, which are then stored in the authentication certificate information library.

The accuracy of data is ensured and the accuracy of inspection is improved by periodically updating the correspondence between inherent attribute identifiers and authentication certificates.

In an embodiment, the foregoing application package inspection method further includes: if the to-be-inspected application package is an authenticated application package, the to-be-inspected application package is marked by using a first identifier; or if the to-be-inspected application package is an unauthenticated application package, the to-be-inspected application package is marked by using a second identifier.

In some embodiments, the first identifier and the second identifier are different identifiers, which may be set according to requirements. The first identifier and the second identifier may be different colors, different text, different characters, different icons, or the like. For example, the first identifier is green and the second identifier is red. Alternatively, the first identifier is "authorized" and the second identifier is "counterfeited". For example, a GUI may be presented on the user terminal including a list of application packages (e.g., selected/requested by the user for inspection) and corresponding identifiers indicating inspection results. Further, an uninstall and/or deletion option may be provided on the GUI besides the second identifier for an unauthenticated application package in the list, and when selected by the user, the disclosed device may uninstall or remove the application package accordingly.

The recognition of whether the application package is secure is improved by marking the inspected application package, making it convenient for a user to distinguish.

In an embodiment, the foregoing application package inspection method further includes: sending, to a publishing platform of the to-be-inspected application package, the inspection result indicating that the to-be-inspected application package is the unauthenticated application package to notify a maintenance personnel of the publishing platform to delete the to-be-inspected application package. In another embodiment, the user terminal may install an inspection client/program. The inspection client is configured to monitor application package downloading requests (e.g., made on a publishing platform) from a user; and when detecting that an application package downloading request originated from a user interface of the publishing platform, the inspection client may send a platform identification of the publishing platform and an application identification of the requested application based on the application package downloading request to the server. The server may query the inspection result associated with the application package and the publishing platform; and return the inspection result to the inspection client. In this way, the inspection client can provide user with inspection result for a specific application offered by a specific publishing platform.

In some embodiments, the publishing platform refers to a place provided by the application package for the user to download. The publishing platform may be the Android market, the application store, or the like. The security of the application packages on the publishing platform is improved by notifying the publishing platform to delete unauthenticated application packages.

In an embodiment, the foregoing application package inspection method further includes: sending prompt information including that the application package is the unauthenticated application package if it is inspected that an installed application package is an unauthenticated application package.

Specifically, the prompt information including that the application package is an unauthenticated application package is sent if it is inspected that an installed application package is an unauthenticated application package, to prompt the user to avoid installing an unidentified application.

Figure 3:
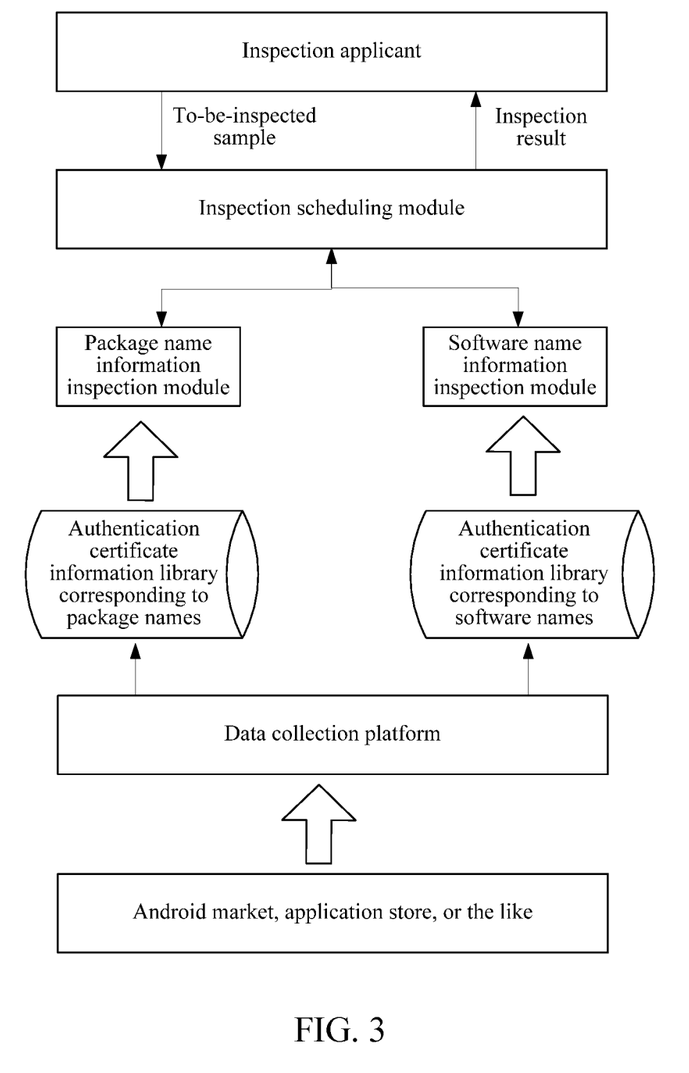
FIG. 3 is a system architecture diagram of an application package inspection method according to an embodiment.

FIG. 3 is a diagram of a system architecture for implementing an application package inspection method according to an embodiment. The system architecture includes a data collection platform, an authentication certificate information library corresponding to package names, an authentication certificate information library corresponding to software names, a package name information inspection module, a software name information inspection module, and an inspection scheduling module. The data collection platform collects application packages that pass security authentication from an Android market or an application store. Package names, software names, and authentication certificates of the application packages are extracted from the application packages that pass security authentication. An index of authentication certificates is established by using the package names as key words and is stored in the authentication certificate information library corresponding to package names. An index of authentication certificates is established by using the software names as key words and is stored in the authentication certificate information library corresponding to software names. An inspection applicant inputs a to-be-inspected sample to the inspection scheduling module, and the inspection scheduling module extracts a package name, a software name, and a certificate of the to-be-inspected application package according to the to-be-inspected sample. The inspection scheduling module transmits the package name and the certificate of the to-be-inspected application package to the package name information inspection module, and transmits the software name of the to-be-inspected application package to the software name information inspection module. The package name information inspection module obtains, from the authentication certificate information library corresponding to package names, a corresponding authentication certificate according to the package name of the to-be-inspected application package. The authentication certificate is compared with the certificate of the to-be-inspected application package. If the authentication certificate is the same as the certificate of the to-be-inspected application package, the to-be-inspected application package is an authenticated application package, or if the authentication certificate is different from the certificate of the to-be-inspected application package, the to-be-inspected application package is an unauthenticated application package. The software name information inspection module obtains, from the authentication certificate information library corresponding to software names, a corresponding authentication certificate according to the software name of the to-be-inspected application package. The authentication certificate is compared with the certificate of the to-be-inspected application package. If the authentication certificate is the same as the certificate of the to-be-inspected application package, the to-be-inspected application package is an authenticated application package, or if the authentication certificate is different from the certificate of the to-be-inspected application package, the to-be-inspected application package is an unauthenticated application package. The package name information inspection module or the software name information inspection module returns an inspection result to the inspection scheduling module, and the inspection scheduling module sends the inspection result to the inspection applicant.

Figure 4:
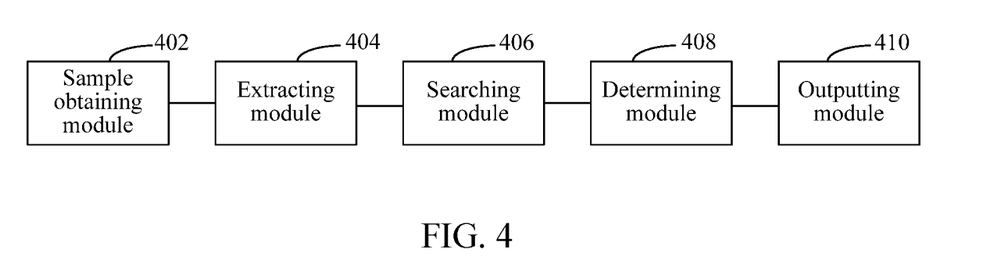
FIG. 4 is a structural block diagram of an application package inspection apparatus according to an embodiment.

FIG. 4 is a structural block diagram of an application package inspection apparatus according to an embodiment. As shown in FIG. 4, an application package inspection apparatus includes a sample obtaining module 402, an extracting module 404, a searching module 406, a determining module 408, and an outputting module 410. Where:

The sample obtaining module 402 is configured to obtain a to-be-inspected application package.

Specifically, a terminal obtains the to-be-inspected application package input by using an inspection client or a browser by a user and uploads same to a serving end.

Alternatively, an application package captured from a network or an application store by the serving end serves as the to-be-inspected application package. The serving end may be located on the server, the cloud, or the like.

The extracting module 404 is configured to extract an inherent attribute identifier and a certificate of the to-be-inspected application package from the to-be-inspected application package.

The searching module 406 is configured to obtain, from a correspondence between inherent attribute identifiers and authentication certificates, an authentication certificate corresponding to the inherent attribute identifier of the to-be-inspected application package according to the inherent attribute identifier of the to-be-inspected application package.

In some embodiments, the correspondence between the inherent attribute identifier and the authentication certificate may be pre-established, and the correspondence is stored in an authentication certificate information library corresponding to inherent attribute identifiers and the authentication certificate.

If the inherent attribute identifier includes the package identifier, a correspondence between the package identifier and the authentication certificate is stored in an authentication certificate information library corresponding to package identifiers. If the inherent attribute identifier includes the software name, a correspondence between the software name and the authentication certificate is stored in an authentication certificate information library corresponding to software names. If the inherent attribute identifier includes the package identifier and the software name, the correspondence between the package identifier and the authentication certificate is stored in the authentication certificate information library corresponding to package identifiers, and the correspondence between the software name and the authentication certificate is stored in the authentication certificate information library corresponding to software names.

The authentication certificate is a certificate of an application package provided by a software provider who passes security authentication.

The determining module 408 is configured to determine whether the certificate of the to-be-inspected application package is consistent with the authentication certificate, and if the certificate of the to-be-inspected application package is consistent with the authentication certificate, it is determined that the to-be-inspected application package is an authenticated application package, or if the certificate of the to-be-inspected application package is not consistent with the authentication certificate, it is determined that the to-be-inspected application package is an unauthenticated application package.

In some embodiments, a message digest value (for example, an md5 value) of the certificate of the to-be-inspected application package and a message digest value of the authentication certificate may be obtained. The message digest value of the certificate of the to-be-inspected application package is compared with the message digest value of the authentication certificate. If the message digest value of the certificate of the to-be-inspected application package is the same as the message digest value of the authentication certificate, the certificate of the to-be-inspected application package is consistent with the authentication certificate of the inherent attribute identifier of the to-be-inspected application package, or if the message digest value of the certificate of the to-be-inspected application package is different from the message digest value of the authentication certificate, the certificate of the to-be-inspected application package is not consistent with the authentication certificate of the inherent attribute identifier of the to-be-inspected application package.

The outputting module 410 is configured to output an inspection result indicating that the to-be-inspected application package is an authenticated application package or an unauthenticated application package.

In the foregoing application package inspection apparatus, by extracting the inherent attribute identifier and the certificate of the to-be-inspected application package, according to the inherent attribute identifier, a corresponding authentication certificate is found from the correspondence between inherent attribute identifiers and authentication certificates. The certificate of the to-be-inspected application package is compared with the authentication certificate, and if the to-be-inspected application package is the same as the authentication certificate, the to-be-inspected application package is an authenticated application package, or if the to-be-inspected application package is different from the authentication certificate, the to-be-inspected application package is an unauthenticated application package. The inspection accuracy is high and may basically reach to 100%. An inspection time is short, and no time and space bottleneck is generated. Therefore, a real-time query service may be provided for massive query systems.

Figure 5:
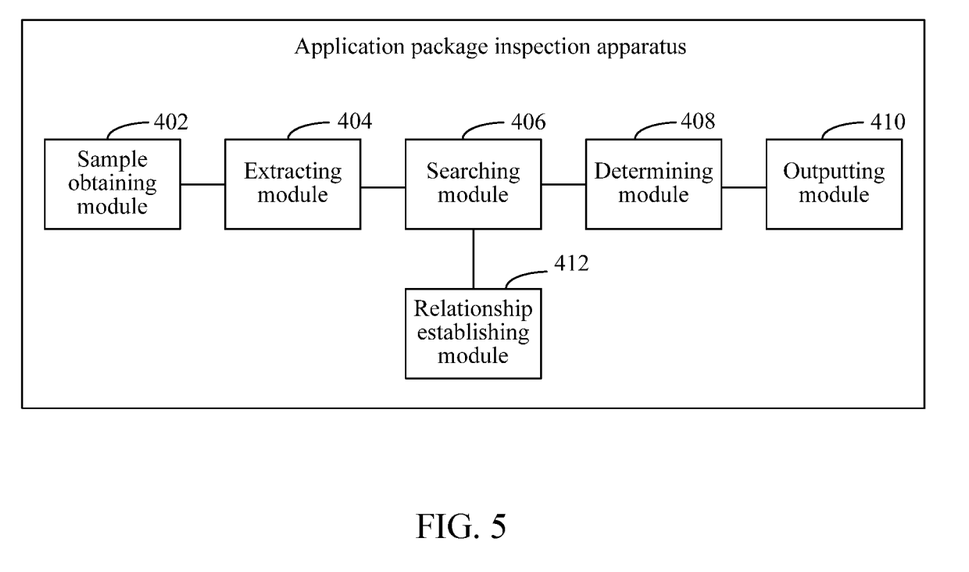
FIG. 5 is a structural block diagram of an application package inspection apparatus according to another embodiment.

FIG. 5 is a structural block diagram of an application package inspection apparatus according to another embodiment. As shown in FIG. 5, an application package inspection apparatus further includes a relationship establishing module 412 apart from the sample obtaining module 402, the extracting module 404, the searching module 406, the determining module 408, and the outputting module 410.

The relationship establishing module 412 is configured to pre-establish a correspondence between an inherent attribute identifier of an application package and an authentication certificate before the to-be-inspected application package is obtained.

The established correspondence between the inherent attribute identifier of the application package and the authentication certificate may be stored in an authentication certificate information library corresponding to inherent attribute identifiers. Alternatively, a table may be established, and the correspondence between inherent attribute identifiers and authentication certificates is recorded by using the table. The inherent attribute identifier is used as a key word to establish an index of authentication certificates.

Figure 6:
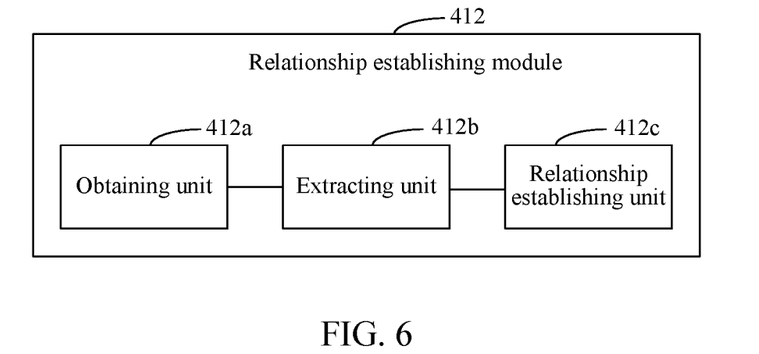
FIG. 6 is a block diagram of an inner structure of a relationship establishing module according to an embodiment.

FIG. 6 is a block diagram of an inner structure of a relationship establishing module 412 according to an embodiment. As shown in FIG. 6, the relationship establishing module 412 includes an obtaining unit 412*a*, an extracting unit 412*b*, and a relationship establishing unit 412*c*. Where:

The obtaining unit 412*a* is configured to obtain an authenticated application package that passes security authentication from a network.

In some embodiments, the obtaining unit 412*a* may obtain the authenticated application package that passes the security authentication from an application store or an Android market.

The extracting unit 412*b* is configured to extract, from the application package that passes security authentication, the inherent attribute identifier and the corresponding authentication certificate of the application package.

The relationship establishing unit 412*c* is configured to establish the correspondence between the inherent attribute identifier of the application package and the authentication certificate according to the inherent attribute identifier and the authentication certificate of the application package.

Specifically, the relationship establishing unit 412*c* establishes an index of authentication certificates by using the inherent attribute identifier as a key word. That is, the correspondence between inherent attribute identifiers and authentication certificates is established.

The inherent attribute identifier of the application package and the corresponding authentication certificate are extracted from the application package that passes the security authentication, thereby ensuring the accuracy and security of the inherent attribute identifier of the application package and the corresponding authentication certificate.

Figure 7:
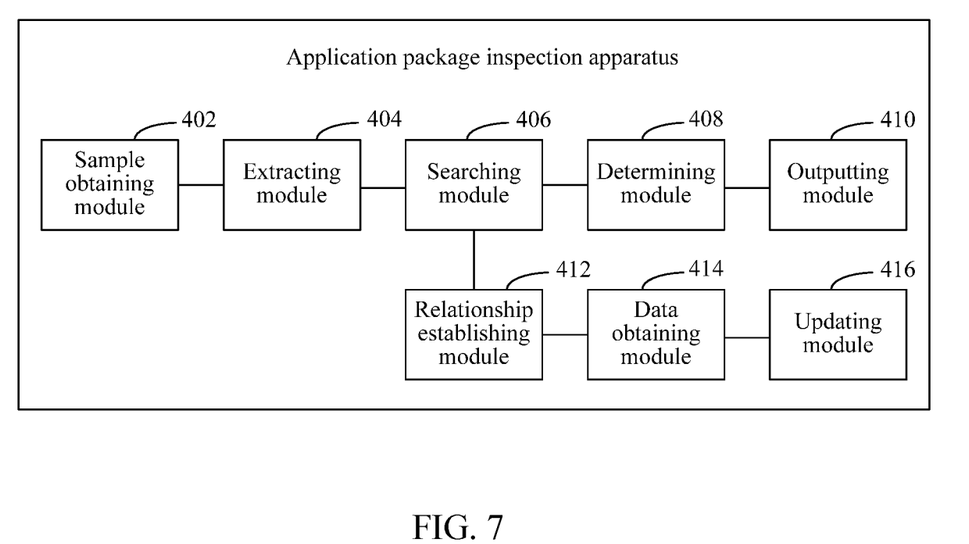
FIG. 7 is a structural block diagram of an application package inspection apparatus according to another embodiment.

FIG. 7 is a structural block diagram of an application package inspection apparatus according to another embodiment. As shown in FIG. 7, an application package inspection apparatus further includes a data obtaining module 414 and an updating module 416 apart from the sample obtaining module 402, the extracting module 404, the searching module 406, the determining module 408, the outputting module 410, and the relationship establishing module 412.

The data obtaining module 414 is configured to periodically obtain the inherent attribute identifier of the application package and the corresponding authentication certificate.

The updating module 416 is configured to update the correspondence between the inherent attribute identifier of the application package and the authentication certificate.

In some embodiments, according to requirements, a periodical period of time may be set to, for example, one day, one week, and one month. The application package that passes the security authentication may be periodically obtained from the application store or the Android market. The inherent attribute identifier of the application package that passes the security authentication and the corresponding authentication certificate are extracted from the application package. The correspondence between the inherent attribute identifier of the application package and the authentication certificate is updated and is stored in the authentication certificate information library corresponding to inherent attribute identifiers.

The accuracy of data is ensured and the accuracy of inspection is improved by periodically updating the correspondence between inherent attribute identifiers and authentication certificates.

Figure 8:
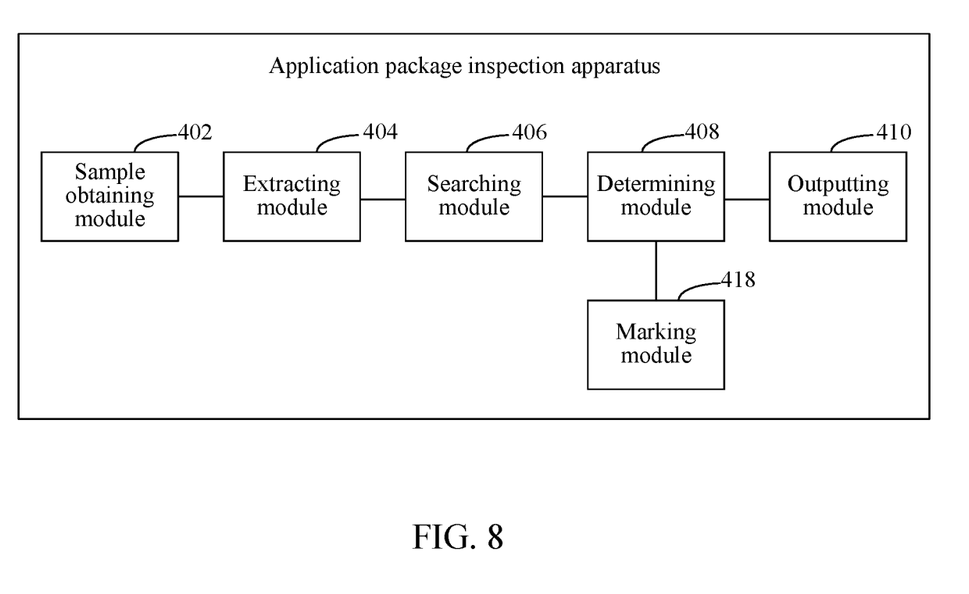
FIG. 8 is a structural block diagram of an application package inspection apparatus according to another embodiment.

FIG. 8 is a structural block diagram of an application package inspection apparatus according to another embodiment. As shown in FIG. 8, an application package inspection apparatus further includes a marking module 418 apart from the sample obtaining module 402, the extracting module 404, the searching module 406, the determining module 408, and the outputting module 410.

The marking module 418 is configured to mark the to-be-inspected application package by using a first identifier if the to-be-inspected application package is an authenticated application package.

Further, the marking module 418 is configured to mark the to-be-inspected application package by using a second identifier if the to-be-inspected application package is an unauthenticated application package.

In some embodiments, the first identifier and the second identifier are different identifiers, which may be set according to requirements. The first identifier and the second identifier may be different colors, different text, different characters, different icons, or the like. For example, the first identifier is green and the second identifier is red. Alternatively, the first identifier is "authorized" and the second identifier is "counterfeited".

The recognition of whether the application package is secure is improved by marking the inspected application package, making it convenient for a user to distinguish.

In an embodiment, the foregoing application package inspection apparatus further includes a sending module. The sending module is configured to send, to a publishing platform of the to-be-inspected application package, the inspection result indicating that the to-be-inspected application package is the unauthenticated application package to notify a maintenance personnel of the publishing platform to delete the to-be-inspected application package.

In an embodiment, the foregoing application package inspection apparatus further includes a prompting module. The prompting module is configured to send prompt information including that the application package is the unauthenticated application package if it is inspected that an installed application package is an unauthenticated application package.

Specifically, the prompt information including that the application package is an unauthenticated application package is sent if it is inspected that an installed application package is an unauthenticated application package, to prompt the user to avoid installing an unidentified application.

In other embodiments, an application package inspection apparatus may include any possible combination of the sample obtaining module 402, the extracting module 404, the searching module 406, the determining module 408, the outputting module 410, the relationship establishing module 412, the data obtaining module 414, the updating module 416, the marking module 418, the sending module, and the prompting module.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments are performed. The storage medium may be a magnetic disc, an optical disc, a read-only memory (ROM), or the like.

The foregoing embodiments only show several implementations of the present disclosure and are described in detail, but they should not be construed as a limit to the patent scope of the present disclosure. It should be noted that, a person of ordinary skill in the art may further make various variations and improvements without departing from the conception of the present disclosure, which shall fall within the protection scope of the present disclosure. Therefore, the protection scope of the patent of the present disclosure shall be subject to the claims.

What is claimed is:

1. An application package inspection method, comprising:
   obtaining a to-be-inspected application package;
   extracting an attribute identifier and a certificate of the to-be-inspected application package from the to-be-inspected application package;
   obtaining, from an information library storing a correspondence between attribute identifiers and authentication certificates, an authentication certificate corresponding to the attribute identifier of the to-be-inspected application package;
   determining whether the certificate of the to-be-inspected application package is consistent with the authentication certificate;
   upon determining the certificate of the to-be-inspected application package is consistent with the authentication certificate, determining that the to-be-inspected application package is an authenticated application package; and
   upon determining the certificate of the to-be-inspected application package is not consistent with the authentication certificate,
      determining that the to-be-inspected application package is an unauthenticated application package; and
      sending, to a publishing platform of the to-be-inspected application package, an inspection result to notify a maintenance personnel of the publishing platform to delete the to-be-inspected application package.

2. The method according to claim 1, further comprising:
   outputting an inspection result indicating that the to-be-inspected application package is the authenticated application package or the unauthenticated application package.

3. The method according to claim 1, wherein before the obtaining the to-be-inspected application package, the method further comprises:
   pre-establishing the correspondence between the attribute identifiers of application packages and the authentication certificates, including:
      obtaining application packages that each passed security authentication from a network;
      extracting, from the application packages that each passed the security authentication, the attribute identifiers and corresponding authentication certificates of the application packages; and
      establishing the correspondence between the attribute identifiers of the application packages and the authentication certificates.

4. The method according to claim 3, further comprising:
   periodically obtaining a latest attribute identifier of each of the application packages and a latest corresponding authentication certificate; and
   updating the correspondence based on the latest attribute identifier and the latest corresponding authentication certificate.

5. The method according to claim 1, further comprising:
   upon determining the to-be-inspected application package is the authenticated application package, marking the to-be-inspected application package using a first identifier; and
   upon determining the to-be-inspected application package is the unauthenticated application package, marking the to-be-inspected application package using a second identifier.

6. The method according to claim 1, wherein the attribute identifier comprises at least one of a package identifier or a software name.

7. The method according to claim 1, further comprising:
   sending prompt information comprising indicating that the to-be-inspected application package is the unauthenticated application package upon determining via inspection that the to-be-inspected application package is the unauthenticated application package.

8. An inspection device, comprising a memory and a processor, the memory storing computer-readable instructions, and when executed by the processor, the instructions causing the processor to perform:
   obtaining a to-be-inspected application package;
   extracting an attribute identifier and a certificate of the to-be-inspected application package from the to-be-inspected application package;
   obtaining, from an information library storing a correspondence between attribute identifiers and authentication certificates, an authentication certificate corresponding to the attribute identifier of the to-be-inspected application package;
   determining whether the certificate of the to-be-inspected application package is consistent with the authentication certificate;
   upon determining the certificate of the to-be-inspected application package is consistent with the authentication certificate, determining that the to-be-inspected application package is an authenticated application package; and
   upon determining the certificate of the to-be-inspected application package is not consistent with the authentication certificate,
      determining that the to-be-inspected application package is an unauthenticated application package; and
      sending, to a publishing platform of the to-be-inspected application package, an inspection result to notify a maintenance personnel of the publishing platform to delete the to-be-inspected application package.

9. The inspection device according to claim 8, wherein the processor is further configured to perform:
   outputting an inspection result indicating that the to-be-inspected application package is the authenticated application package or the unauthenticated application package.

10. The inspection device according to claim 8, wherein before the obtaining the to-be-inspected application package, the processor is further configured to perform:

pre-establishing the correspondence between the attribute identifiers of application packages and the authentication certificates, including:
obtaining application packages that each passed security authentication from a network;
extracting, from the application packages that each passed the security authentication, the attribute identifiers and corresponding authentication certificates of the application packages; and
establishing the correspondence between the attribute identifiers of the application packages and the authentication certificates.

11. The inspection device according to claim 10, wherein the processor is further configured to perform:
periodically obtaining a latest attribute identifier of each of the application packages and a latest corresponding authentication certificate; and
updating the correspondence based on the latest attribute identifier and the latest corresponding authentication certificate.

12. The inspection device according to claim 8, wherein the processor is further configured to perform:
upon determining the to-be-inspected application package is the authenticated application package, marking the to-be-inspected application package is by using a first identifier; and
upon determining the to-be-inspected application package is the unauthenticated application package, marking the to-be-inspected application package using a second identifier.

13. The inspection device according to claim 8, wherein the attribute identifier comprises at least one of a package identifier or a software name.

14. The inspection device according to claim 8, wherein the processor is further configured to perform:
sending prompt information comprising indicating that the to-be-inspected application package is the unauthenticated application package upon determining via inspection that the to-be-inspected application package is the unauthenticated application package.

15. A non-transitory storage medium storing computer program code executable by at least one processor to perform:
obtaining a to-be-inspected application package;
extracting an attribute identifier and a certificate of the to-be-inspected application package from the to-be-inspected application package;
obtaining, from an information library storing a correspondence between attribute identifiers and authentication certificates, an authentication certificate corresponding to the attribute identifier of the to-be-inspected application package;
determining whether the certificate of the to-be-inspected application package is consistent with the authentication certificate;
upon determining the certificate of the to-be-inspected application package is consistent with the authentication certificate, determining that the to-be-inspected application package is an authenticated application package; and
upon determining the certificate of the to-be-inspected application package is not consistent with the authentication certificate,
determining that the to-be-inspected application package is an unauthenticated application package; and
sending, to a publishing platform of the to-be-inspected application package, an inspection result to notify a maintenance personnel of the publishing platform to delete the to-be-inspected application package.

16. The method according to claim 1, further comprising:
displaying, on a user interface of a user terminal, a list of application packages and respective inspection results, the list of application packages including the to-be-inspected application package;
displaying, on the user interface of the user terminal, an uninstall or delete option next to any of the list of the application packages that is unauthorized.

17. The method according to claim 1, wherein the publishing platform includes an Android market or an application store.

18. The method according to claim 1, wherein determining whether the certificate of the to-be-inspected application package is consistent with the authentication certificate includes:
determining whether a message digest value of the certificate of the to-be-inspected application package is the same as a message digest value of the authentication certificate.

* * * * *